US008456474B2

(12) United States Patent
Onizawa

(10) Patent No.: US 8,456,474 B2
(45) Date of Patent: Jun. 4, 2013

(54) METHOD FOR RENDERING OUTLINE OF POLYGON AND APPARATUS OF RENDERING OUTLINE OF POLYGON

(75) Inventor: Hironori Onizawa, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 777 days.

(21) Appl. No.: 12/708,821

(22) Filed: Feb. 19, 2010

(65) Prior Publication Data

US 2010/0295857 A1  Nov. 25, 2010

(30) Foreign Application Priority Data

May 24, 2009  (JP) ................................. 2009-124783

(51) Int. Cl.
*G06T 11/20*  (2006.01)

(52) U.S. Cl.
USPC .......................................................... 345/441

(58) Field of Classification Search
USPC ............................................................ 715/855
See application file for complete search history.

(56) References Cited

U.S. PATENT DOCUMENTS

| 6,918,105 B2 * | 7/2005 | Mayhew ........................ 716/55 |
| 7,669,169 B2 * | 2/2010 | Falbo et al. ...................... 716/50 |
| 7,840,032 B2 * | 11/2010 | Ofek .............................. 382/113 |
| 2004/0212627 A1 | 10/2004 | Sumizawa et al. | |
| 2006/0129316 A1 | 6/2006 | Park | |

FOREIGN PATENT DOCUMENTS

| JP | 11-191111 | 7/1999 |
| JP | 2004-132814 | 4/2004 |

* cited by examiner

*Primary Examiner* — Daniel Hajnik
*Assistant Examiner* — Anh-Tuan V Nguyen
(74) *Attorney, Agent, or Firm* — Brinks Hofer Gilson & Lione

(57) ABSTRACT

A database compiler sequentially selects element points constituting an outline of a polygon corresponding to polygon data obtained from a map database. When it is determined that one of the selected polygon element points is positioned on a map mesh boundary, a coordinate of the polygon element point is shifted toward an inside portion of the polygon by 1 point. When the polygon is to be displayed in an emphatic manner, the polygon data which has been coordinate-shifted is obtained. When it is determined that a portion of the outline of the polygon corresponding to the obtained polygon data is positioned on one of the map mesh boundaries, the portion of the outline is displayed in a non-emphatic manner and the remaining portions of the outline are displayed in an emphatic manner.

16 Claims, 13 Drawing Sheets

NORTHERN LATITUDE OF 45°

METHOD FOR RENDERING OUTLINE OF POLYGON AND APPARATUS OF RENDERING OUTLINE OF POLYGON

PRIORITY CLAIM

This application claims the benefit of Japanese Patent Application No. 2009-124783, filed on May 24, 2009, and which is incorporated by reference herein in its entirety.

BACKGROUND

1. Field of the Invention

This disclosure relates to a method for rendering an outline of a planar polygon when a map is displayed in a navigation device, for example, so that an edge line of the polygon is emphatically displayed or displayed in an emphatic manner, and an apparatus employing the method.

2. Description of the Related Art

In a navigation device, for example, map data corresponding to a map including a current position or a specified point as a center is read from a database in a map/information data recording medium such as a DVD (Digital Versatile Disc) or a hard disk so that the map is displayed. In many cases, the map data in the database recorded in the map/information data recording medium is divided as map meshes having an appropriate size of a longitude width and a latitude width in accordance with various scale levels, and roads and the like are stored as collections of coordinates of nodes represented using the longitude and the latitude. Each of the roads is constituted by a connection of at least two nodes. The map data includes road data including a road list, a node table, and a list of nodes constituting intersection, polygon data used to display the roads, architectures, facilities, parks, and rivers, and information data used to display map symbols and text representing names of administrative areas, names of the roads, names of the intersections, and names of the facilities, for example.

Various examples of the polygon data include a polygon line. As shown in examples of maps in FIGS. 13A and 13B, facilities having planer shapes to be emphasized are displayed as polygons and roads and railway tracks in which positions of their lines rather than shapes are to be emphasized are displayed as polylines.

For example, in the maps shown in FIGS. 13A and 13B which are displayed in a monitor, facilities are displayed as polygons and roads and railway tracks are displayed as polylines. In such map display, if a user wishes to obtain a shape of a specific facility among the facilities denoted by the various polygons, the user can easily recognize the shape when a technique of emphasizing an edge line of a polygon corresponding to the specific facility so that the shape of the polygon is clearly displayed is used. According to this technique, as shown in FIG. 13B, when a cursor is moved to point a specific facility, outlines are displayed by heavy lines so that the specific facility is clearly displayed. Note that in addition to the technique of displaying an outline of a specific one of various polygons included in a map by a heavy line, a technique of displaying outlines of all polygons in an emphatic manner with heavy lines may be used.

Note that Japanese Unexamined Patent Application Publication No. 2004-132814 discloses a technique of correcting boundary lines of a polygon in accordance with a region in an extracted range so that the polygon is redefined and delivering road map data. Furthermore, Japanese Unexamined Patent Application Publication No. 11-191111 discloses a technique of extracting a first small polygon including an arbitrary point to be included in a polygon and further extracting a second small polygon adjacent to the first small polygon so that the polygon is constituted by small polygons and generating the polygon by connecting the small polygons to one another.

As described above, especially when a large national park or a large airport is to be viewed in a wide-area map in which an outline of a polygon is displayed in an emphatic manner, the polygon may be included in a plurality of map meshes. For example, when a large polygon denoted by hatching as shown in FIG. 9A is displayed, data of the polygon may be included in map meshes 1 to 18. This polygon data is displayed so that boundary line portions of the map meshes are inconspicuously displayed as shown in FIG. 9B.

When the polygon displayed as shown in FIG. 9B is instructed to be displayed in an emphatic manner so as to be clearly viewed, a map display processor displays the outline of the polygon included in the map meshes in an emphatic manner as shown in FIG. 9C and combines the map meshes with one another so that the polygon is displayed as shown in FIG. 9D. Accordingly, the polygon is not clearly viewed or at least appearance of the polygon is not good. Examples of such display include display of a map of the area around Great Lakes shown in FIG. 7A and display of an airport shown in FIG. 8A.

In such polygon emphasis display as described above, when an outline of a polygon is displayed by a heavy line, map mesh boundary lines are also emphasized. To address this problem in which an entire map is not clearly viewed, a process of not displaying map mesh boundary line portions as shown in FIG. 9D, for example, may be used as a solution. This process is effective to the case where, as shown in FIGS. 9A to 9D, the entire outline of the polygon is a curved line and is not included in any of the boundary lines. However, in a case where a portion of the outline of the polygon overlaps with one of the map mesh boundary lines, when the process of not displaying map mesh boundary line portions is performed, the portion of the outline of the polygon may be removed. Examples of this case are shown in FIGS. 10A and 10B to FIGS. 12A and 12B.

For convenience of description, in FIGS. 10A and 10B to FIGS. 12A and 12B, an outline of a polygon is constituted by lines a to b, b to c, c to d, . . . , and q to a as examples. In the examples shown in FIGS. 10A and 10B to FIGS. 12A and 12B, in the outline, the line d to e overlaps with a horizontal boundary line of map meshes, the line e to f overlaps with a vertical boundary line of map meshes, the line i to j overlaps with a vertical boundary line, the line l to m overlaps with a horizontal boundary line, the line p to q overlaps with a horizontal boundary line, and the line q to a overlaps with a vertical boundary line.

As described above, when the outlines overlap with the map mesh boundary lines, data blocks of the polygon are independently included in the respective map meshes as shown in FIG. 10B. Therefore, in FIG. 11A in which polygon data shown in FIG. 10A is displayed, when the user provides instruction to display the polygon in an emphatic manner by pointing the polygon by a cursor, since the outline of the polygon is emphatically displayed in the individual map meshes as shown in FIG. 11B, the map meshes boundary line portions of the polygon are also displayed in the individual map meshes in an emphatic manner. Accordingly, the polygon to be displayed by combining the map meshes includes the map mesh boundary lines which are displayed in an emphatic manner as shown in FIG. 12A. Consequently, as with the case of FIG. 9D, the polygon is not clearly viewed, and at least appearance of the polygon is not good.

To address this problem, if lines on the map mesh boundary lines are removed when the polygon as shown in FIG. 12A is displayed, portions of the outline of the polygon which are positioned on the map mesh boundary lines are also removed as shown in FIG. 12B. Accordingly, also in this case, the polygon is not clearly viewed, and at least appearance of the polygon is not good. That is, when the outline of the polygon is displayed in an emphatic manner, the map mesh boundary line portions are also emphatically displayed whereas when the map mesh boundary lines are merely removed, the portions of the outline of the polygon on the map mesh boundary lines are also removed, and accordingly, this is not an efficient solution.

SUMMARY

Accordingly, it is an object of the present invention to provide a method for rendering an outline of a polygon in which map mesh boundary lines are not displayed in an emphatic manner when an outline of a polygon is emphatically displayed, and the outline is not removed but displayed even when portions of the outline of the polygon are positioned on the map mesh boundary lines, and an apparatus employing the method.

According to an embodiment of the present invention, there is provided a method for rendering an outline of a polygon including the steps of sequentially selecting element points included in an outline of a polygon represented by polygon data obtained from a map database, performing, when it is determined that a selected one of the polygon element points is positioned on a map mesh boundary, a process of shifting a coordinate of the polygon element point toward an inside of the polygon by a predetermined amount, obtaining the polygon data which has been subjected to the coordinate shifting process when the polygon is to be emphatically displayed in a monitor, and not emphatically displaying a portion of the outline but emphatically displaying the other portions of the outline when the portion of the outline of the polygon represented by the obtained polygon data is positioned in a map mesh boundary.

The process of shifting a coordinate (coordinate-shifting) of a polygon element point toward an inside of a polygon by a predetermined amount may be performed on a polygon in a range of a displayed map when the map is displayed in the monitor.

The process of coordinate-shifting of a polygon element point toward an inside of a polygon by a predetermined amount may be performed on map data in a predetermined distance range including a region around a range of a displayed map when a map is displayed in the monitor.

The process of shifting a coordinate of a polygon element point toward an inside of a polygon by a predetermined amount may be performed on map data in an arbitrary range also in cases other than the case where a map is not displayed in the monitor.

The process of shifting a coordinate of a polygon element point toward an inside of a polygon by a predetermined amount may be performed only on a polygon selected by a user.

All polygons to be displayed in the monitor may be selected to be subjected to the process of shifting a coordinate of a polygon element point toward an inside of a polygon by a predetermined amount.

The process of shifting a coordinate of a polygon element point toward an inside of a polygon by a predetermined amount may be performed when the map database is constructed, and resultant data may be recorded in the map database together with data which has not been processed.

Data which has been subjected to the process of shifting a coordinate of a polygon element point toward an inside of a polygon by a predetermined amount may be stored, and thereafter, the stored data may be used when the polygon is to be displayed, instead of polygon data which has not been subjected to the process.

The process of shifting a coordinate of a polygon element point toward an inside of a polygon by a predetermined amount may be performed by a database compiler so that data recorded in the map database is displayed as a map.

When the process of not emphatically displaying an outline is performed, any outline may not be displayed.

According to another embodiment of the present invention, there is provided a polygon outline rendering apparatus including a database data processor and a map display unit. The database data processor includes a polygon element point selecting unit configured to sequentially select element points included in an outline of a polygon corresponding to polygon data obtained from a map database, a unit for detecting an outline portion of a polygon on a map mesh boundary configured to determine whether one of the polygon element points selected by the polygon element point selecting unit is positioned on a map-mesh boundary, and a coordinate shifting processor configured to perform a process of shifting a coordinate of a polygon element point toward an inside of a polygon by a predetermined amount, when it is determined that one of the polygon element points detected by the unit for detecting an outline portion of a polygon on a map mesh boundary is positioned on a map-mesh boundary. The map display unit configured to display a map in a monitor includes a unit for obtaining data which has been subjected to the shifting process configured to obtain the polygon data which has been subjected to the coordinate shifting process performed by the database data processor, a unit for detecting an outline portion of a polygon on a map mesh boundary configured to determine whether an outline portion of the polygon corresponding to the data obtained by the unit for obtaining data which has been subjected to the shifting process is positioned on a map mesh boundary when the polygon is to be emphatically displayed, and a polygon emphasis display processor configured not to emphatically display the outline portion of the polygon, when the unit for detecting an outline portion of a polygon on a map mesh boundary determined that the outline portion of the polygon is positioned on the map mesh boundary, and configured to emphatically display the other outline portions of the polygon.

In the polygon outline rendering apparatus, the process of shifting a coordinate of a polygon element point toward an inside of a polygon by a predetermined amount may be performed on a polygon in a range of a displayed map when the map is displayed in the monitor.

In the polygon outline rendering apparatus, the process of shifting a coordinate of a polygon element point toward an inside of a polygon by a predetermined amount may be performed on map data in a predetermined distance range including a region around a range of a displayed map when a map is displayed in the monitor.

In the polygon outline rendering apparatus, the process of shifting a coordinate of a polygon element point toward an inside of a polygon by a predetermined amount may be performed on map data in an arbitrary range also in cases other than the case where a map is not displayed in the monitor.

In the polygon outline rendering apparatus, the process of shifting a coordinate of a polygon element point toward an inside of a polygon by a predetermined amount may be performed only on a polygon selected by a user.

In the polygon outline rendering apparatus, all polygons to be displayed in the monitor may be selected to be subjected to the process of shifting a coordinate of a polygon element point toward an inside of a polygon by a predetermined amount.

In the polygon outline rendering apparatus, the process of shifting a coordinate of a polygon element point toward an inside of a polygon by a predetermined amount may be performed when the map database is constructed, and resultant data may be recorded in the map database together with data which has not been processed.

In the polygon outline rendering apparatus, data which has been subjected to the process of shifting a coordinate of a polygon element point toward an inside of a polygon by a predetermined amount may be stored, and thereafter, the stored data may be used when the polygon is to be displayed, instead of polygon data which has not been subjected to the process.

In the polygon outline rendering apparatus, the database data process may be performed by a database compiler so that data recorded in the map database is displayed as a map.

In the polygon outline rendering apparatus, any outline of the polygon may not be displayed in a portion in which the polygon emphasis display processor determines that emphasized display is not performed.

Since an embodiment of the present invention is configured as described above, when an outline of a polygon is to be emphatically displayed, map mesh boundary lines are not emphatically displayed, and in addition, even when the outline of the polygon is positioned on one of the map mesh boundary lines, the outline is not removed. In this way, a method for rendering an outline of a polygon included in a map which has excellent appearance and which is clearly viewed and an apparatus employing the method can be provided.

DESCRIPTION OF THE PREFERRED EMBODIMENTS

Figure 1:
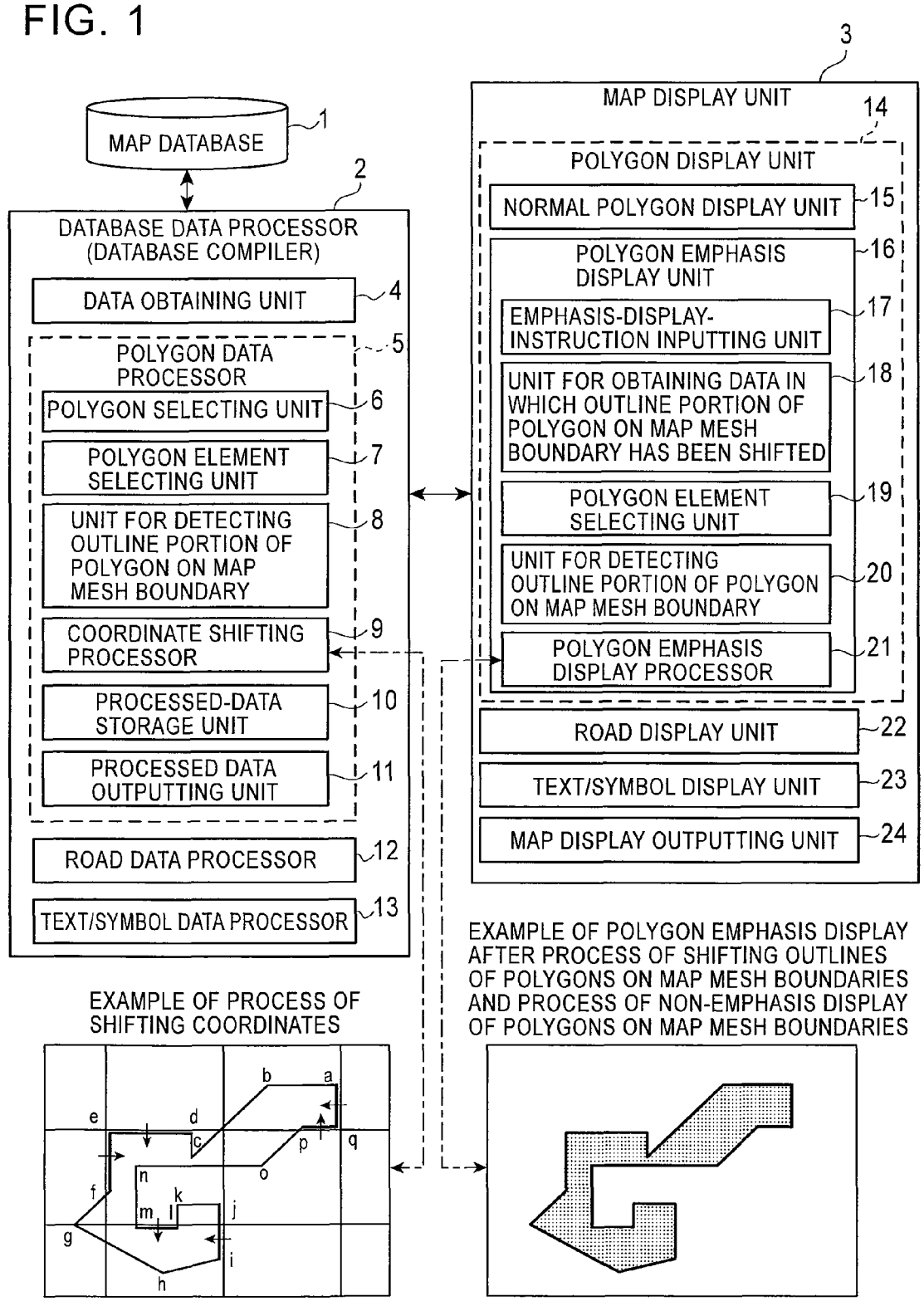
FIG. 1 is a function block diagram illustrating a map display device according to an embodiment of the present invention.

An embodiment of the present invention will be described with reference to the accompanying drawings. FIG. 1 is a function block diagram illustrating a map display apparatus according to an embodiment of the present invention. In an example shown in FIG. 1, before map data is obtained from a map database 1 so that a map is displayed in a monitor, the data in the map database 1 is processed by a database data processor 2 such as a database compiler and a map corresponding to the map data is displayed in a map display unit 3. Especially, in this embodiment, since a process of emphatically displaying a polygon is performed, a process performed by a polygon data processor 5 included in the database data processor 2 such as the database compiler and a process performed by a polygon emphasis display unit 16 included in the map display unit 3 are mainly described.

In the example shown in FIG. 1, when the map data recorded in the map database 1 is to be displayed by the map display unit 3, the processed by the database data processor 2 is used. In the database data processor 2, a data obtaining unit 4 selects and obtains desired map data from the map database 1. The polygon data processor 5 processes polygon data among various map data, and especially, the polygon data processor 5 processes data of a polygon having a planar shape in this embodiment. The polygon data processor 5 includes a polygon selecting unit 6 which arbitrarily selects, when a plurality of polygons are included in certain map data obtained by the data obtaining unit 4, the polygons in a sequential manner, and which performs a process of shifting coordinates of polygon outline portions positioned on map mesh boundaries, which will be described hereinafter, on all the polygons.

A polygon element point selecting unit 7 sequentially selects element points which constitute the polygon selected by the polygon selecting unit 6. A unit 8 for detecting outline portions of a polygon on map mesh boundaries detects portions of an outline of the polygon which are positioned on boundary lines of map meshes. Upon the detection, since the map mesh boundary lines have position data in advance, it is determined that element points corresponding to the data are positioned on the map mesh boundary lines.

When the unit 8 for detecting polygon outline portions on map mesh boundaries determined that a polygon outline portion is positioned on a coordinate boundary, a coordinate shifting processor 9 performs a process of shifting a coordinate toward an inside of the polygon by 1 as described below and as briefly shown in FIG. 1. Since a normal map mesh includes coordinate points of thirty thousands or more of rows and thirty thousands or more of columns, even when a coordinate is shifted by 1, the shifting is not recognized through the monitor. However, the determination as to whether an element point of the polygon is positioned on a map mesh boundary has important implications on data.

A processed-data storage unit 10 stores data which has been subjected to the coordinate shifting process in a certain storage region. When the map database 1 corresponds to a hard disk, the data is stored in a predetermined storage region thereof. When the data is not allowed to be stored in the map database 1, the data is stored in a memory separately provided.

An amount of data which has been subjected to the coordinate shifting process and which has been stored in the processed-data storage unit 10 is small, only when the data is used for a process performed on a polygon included in a map to be currently displayed in the map display unit 3. An amount of data stored in the processed-data storage unit 10 is large, when the data of a map of a large region which has been normally used by the user is processed in advance and the data is stored.

Furthermore, the function of the polygon data processor 5 included in the database data processor 2 may be performed by a computer of a manufacturer of the navigation device, for example, so that processed data is added to basic map data as data to be supplied to the user and the resultant data may be stored in the same map data storage medium. Moreover, the polygon data processed as described above may be stored so as to be used hereafter instead of a previous polygon data which has been stored.

A processed-data outputting unit 11 obtains, when the data stored in the processed-data storage unit 10 as described above is to be used by the map display unit 3, desired processed data from the processed-data storage unit 10 and outputs the desired processed data to the map display unit 3. Furthermore, the database data processor 2 includes, in addition to the polygon data processor 5 which performs the process as described above so that the map data is displayed, a road data processor 12 which processes road data which is the most basic data. Moreover, the database data processor 2 includes a text/symbol data processor 13 used to display various map symbols and text data representing names of administrative areas such as names of municipalities, names of roads, names of intersections, and names of the facilities, for example.

The map display unit 3 shown in FIG. 1 is used to display a polygon included in map data in a polygon display unit 14 included therein, and furthermore, the polygon display unit 14 includes a normal polygon display unit 15 and the polygon emphasis display unit 16. Note that the normal polygon display unit 15 performs normal display of a polygon except when a polygon is emphatically displayed in a map using the polygon emphasis display unit 16. Therefore, when an outline of a polygon is not to be displayed or when an outline of a polygon is to be displayed as a thin line, and when a polygon represents a facility, the polygon is displayed by various methods including a method for slightly adding shade to portions of the outline so that the facility is displayed in a three dimensional manner.

The polygon emphasis display unit 16 performs a process of emphatically displaying a polygon displayed in the monitor. Here, when the user moves the cursor to point a specific polygon in a map screen currently displayed in the monitor, an emphasis-display-instruction inputting unit 17 is used. Furthermore, in a case where all polygons displayed in the monitor are determined to be emphatically displayed in advance, even when the user does not perform a special instruction, the emphasis-display-instruction inputting unit 17 may determine that all the polygons currently displayed are instructed to be emphatically displayed and obtain the polygons.

A unit 18 for obtaining data in which an outline portion of a polygon on a map mesh boundary has been shifted obtains data which has been subjected to the process of shifting an outline portion of a polygon on a map mesh boundary inward by 1 which has been performed by the coordinate shifting processor 9 of the polygon data processor 5 included in the database data processor 2. Here, when an outline portion of a polygon is not positioned on any map mesh boundary in a region of a map currently displayed, data is not obtained by the unit 18, and therefore, subsequent processes are not performed. Note that an outline of a polygon may be not only shifted by 1 but also arbitrarily shifted by 2 or more. However, increment of the amount of shifting is not required, and small amount of shifting is preferable in terms of reduction of processing loads.

When a polygon corresponding to data which has been subjected to the shifting process is included in polygons currently displayed, the unit 18 for obtaining data in which an outline portion of a polygon on a map mesh boundary has been shifted obtains the data, and a polygon element selecting unit 19 performs a process of sequentially selecting polygon elements of the obtained polygon. When the polygon is to be displayed in the monitor, an outline of the polygon is represented by lines each of which connects two points to each other. Accordingly, the polygon element selecting unit 19 selects a portion of the outline of the polygon by selecting the two points.

A unit 20 for detecting an outline portion of a polygon on a map mesh boundary determines whether a polygon element portion selected by the polygon element selecting unit 19 is positioned on a map mesh boundary. In this embodiment, the unit 20 detects whether a polygon element portion currently selected is positioned on a map mesh boundary, that is, whether a line which connects element points of the polygon currently selected to each other is positioned on a map mesh boundary using data the same as map mesh boundary data in which map data stored in the map database 1 is divided for individual map meshes.

A polygon emphasis display processor 21 performs, when the unit 20 detected a polygon outline portion which is positioned on a map mesh boundary, a process of emphatically display portions of the outline other than the detected polygon outline portion. A polygon subjected to this process is output and displayed by a map display outputting unit 24 while the entire outline of the polygon is emphasized but boundaries of the map meshes included in the polygon are not emphasized as shown below the map display unit 3 in FIG. 1. Note that, in order not to emphatically display boundaries of map meshes, the boundaries of map meshes may be displayed by a color lighter than that for portions to be emphasized or by unemphatic color, or may not be displayed at all, for example.

The map display unit 3 shown in FIG. 1 includes, in addition to the polygon display unit 14 described above, a road display unit 22 and a text/symbol display unit 23, and performs a process of displaying a map using these display units as with a conventional process. Furthermore, a map display outputting unit 24 performs a process of outputting and displaying road symbols and character symbols in addition to the process of displaying a polygon. The polygon, the road symbols, and the character symbols are included in respective layers and are displayed in the monitor so that the polygon, the road symbols, and the character symbols overlap with one another.

Figure 2:
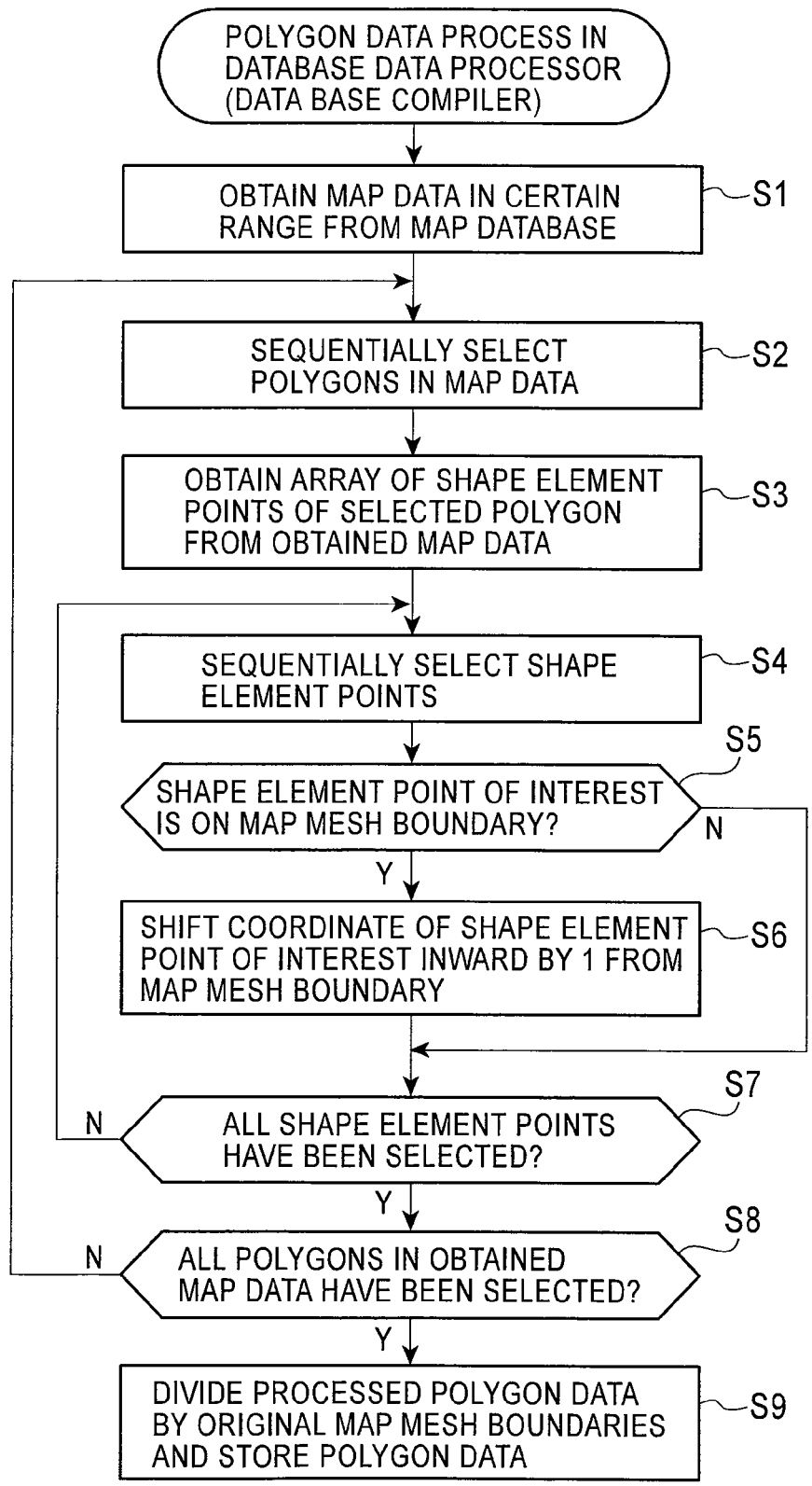
FIG. 2 is a flowchart illustrating a polygon data process performed by a database data processor according to the embodiment.
Figure 3:
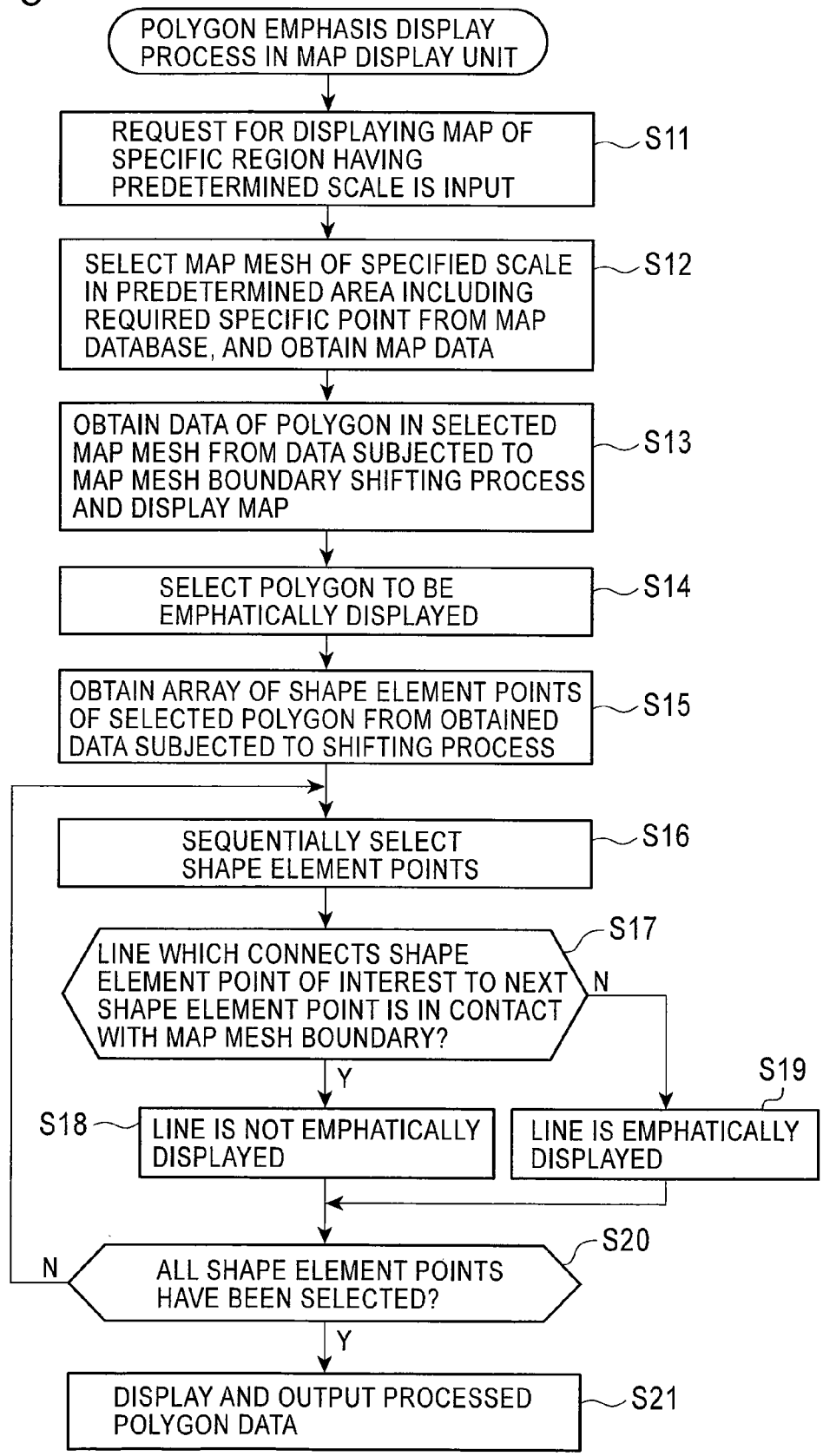
FIG. 3 is a flowchart illustrating a polygon emphasis display process performed by a map display unit according to the embodiment.

In the map display apparatus having the function block shown in FIG. 1, the polygon emphasis display process can be performed in accordance with a flowchart shown in FIG. 2 illustrating a flow of a polygon data process performed by the database data processor 2 and a flowchart shown in FIG. 3 illustrating a flow of a polygon emphasis display process performed by the map display unit 3, for example. These process flows are described with reference to the function block diagram of FIG. 1 and explanation diagrams of FIGS. 4 to 8.

In step S1 of the polygon data process shown in FIG. 2, the database data processor 2 such as a database compiler obtains map data corresponding to a certain region from the map database 1. Note that the map data corresponding to the certain region is obtained by the data obtaining unit 4 included in the database data processor 2 shown in FIG. 1 from the map database 1. An appropriate method of obtaining the map data is employed depending on various situations as described in the description with reference to FIG. 1. Example of the map data corresponding to the certain region include data corresponding to a specific point and a region in the vicinity of the specific point which are currently displayed in a monitor, data corresponding to a region of the map in a certain scale, data corresponding to a region around the specific point, data corresponding to a region of the map which is normally used by the user, and the entire map data recorded in the map database 1.

In step S2, polygons included in the map data is sequentially selected. Specifically, when a plurality of polygons are included in the map data obtained in step S1, all the polygons are to be processed, and accordingly, the polygons are selected in an appropriate order. Note that, when map data which corresponds to a range of the map currently displayed and which is obtained in step S1 does not include polygon data, the process in step S2 and subsequent processes are not performed. On the other hand, when the map data includes polygon data corresponding to a single polygon, the polygon data corresponding to the single polygon is selected in step S2.

In step S3, one of the polygons is selected and shape element points of the selected polygon are obtained from the obtained map data. Specifically, an array of the shape element points of the selected one of the polygons obtained in step S2 is obtained. Thereafter, the obtained shape element points are sequentially selected one by one so that the subsequent processes are performed on all the shape element points. In step S5, it is determined whether a selected one of the shape element points is positioned on any one of map mesh boundaries. When the determination is affirmative in step S5, a process of shifting a coordinate of the shape element point of interest inward from the map mesh boundary of interest is performed in step S6.

Then, as with the case where the determination is negative in step S5, the process proceeds to step S7 where it is determined whether all the shape element points have been selected. When the determination is negative in step S7, the process returns to step S4 where the shape element points are sequentially selected, and the processes in step S5 onward are performed again.

When the determination is affirmative in step S7, the process proceeds to step S8 where it is determined whether all the polygons included in the map data have been selected. When the determination is negative in step S8, the process returns to step S2 where the polygons included in the map data are sequentially selected and the processes in step S3 and onward are performed again. On the other hand, when the determination is affirmative in step S8, the process proceeds to step S9 where the processed polygon data is divided by the original map mesh boundaries and the divided data is stored.

This process is executed in the polygon data processor 5 included in the database data processor 2 shown in FIG. 1 such that the polygon element point selecting unit 7 selects polygon element points of a polygon selected by the polygon selecting unit 6, the coordinate shifting processor 9 performs the process described above on a polygon outline portion detected by the unit 8 for detecting polygon outline portions on map mesh boundaries, and these operations are repeatedly performed.

Figure 4A:
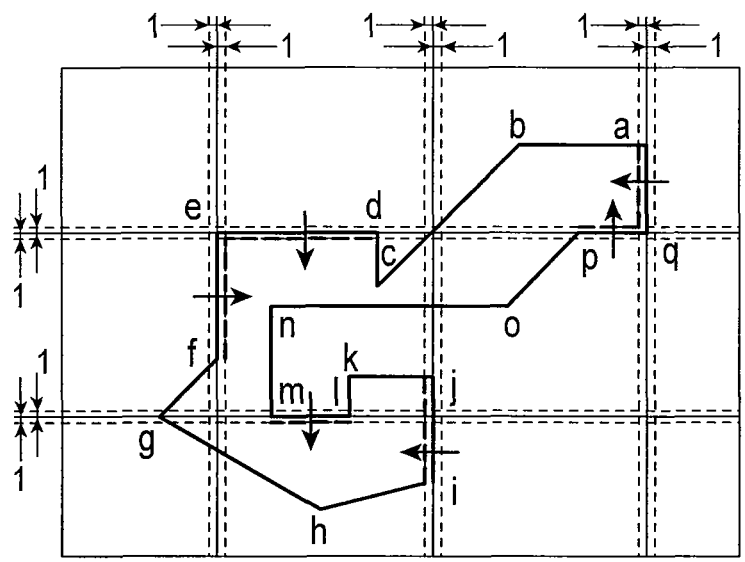
FIGS. 4A and 4B are diagrams illustrating an example of a process performed by a database compiler serving as a database data processor according to the embodiment.
Figure 4B:
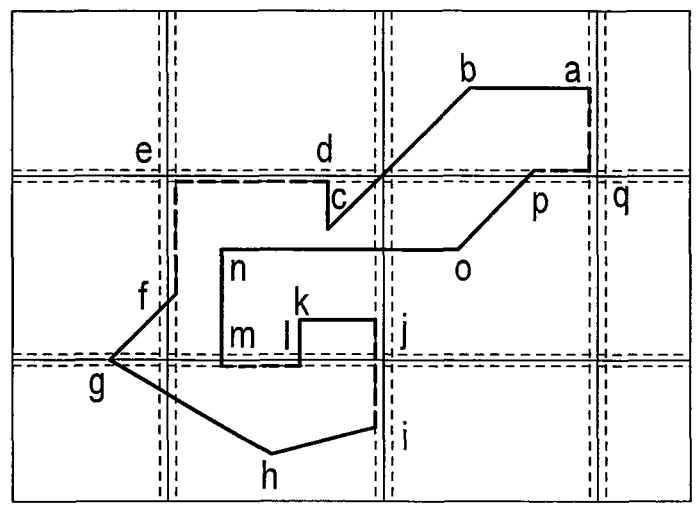
Figure 10A:
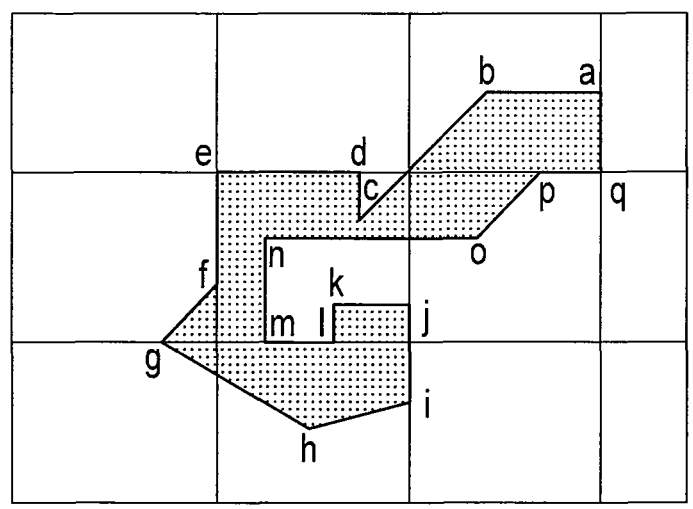
FIGS. 10A and 10B are diagrams illustrating an example of data when portions of an outline of the polygon are positioned on map mesh boundary lines.
Figure 10B:
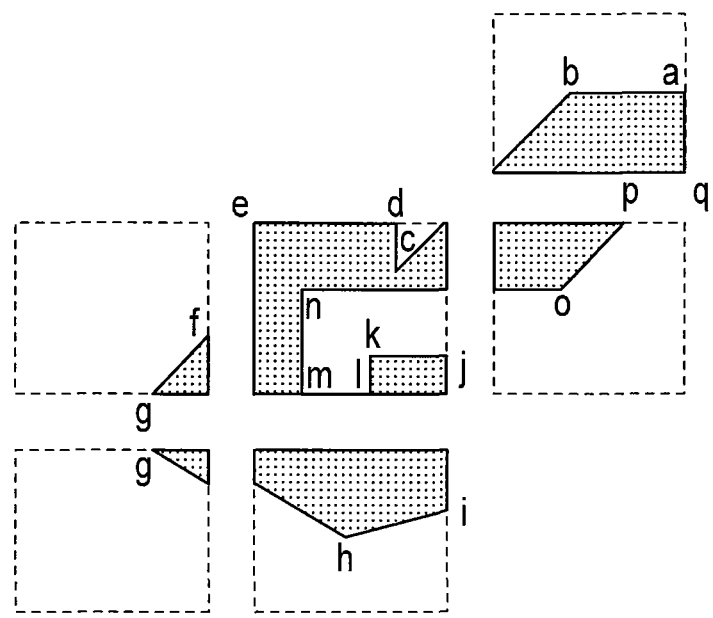
Figure 11A:
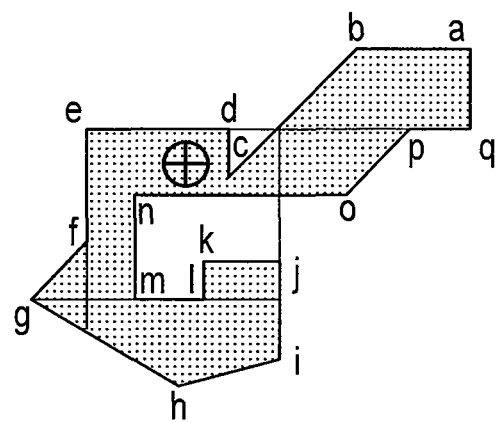
FIGS. 11A and 11B are diagrams illustrating an example of data when the portions of the outline of the polygon are emphatically displayed.
Figure 11B:
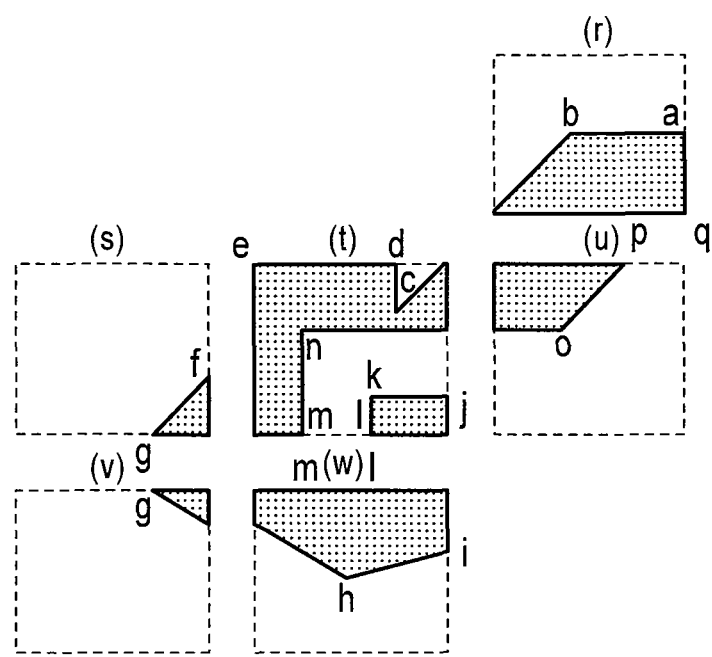
Figure 12A:
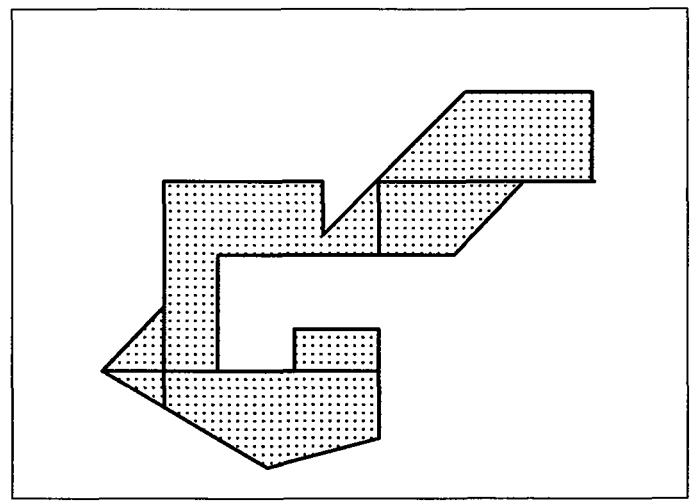
FIGS. 12A and 12B are diagrams illustrating examples of display in the related art when the outlines of the polygon are emphatically displayed.
Figure 12B:
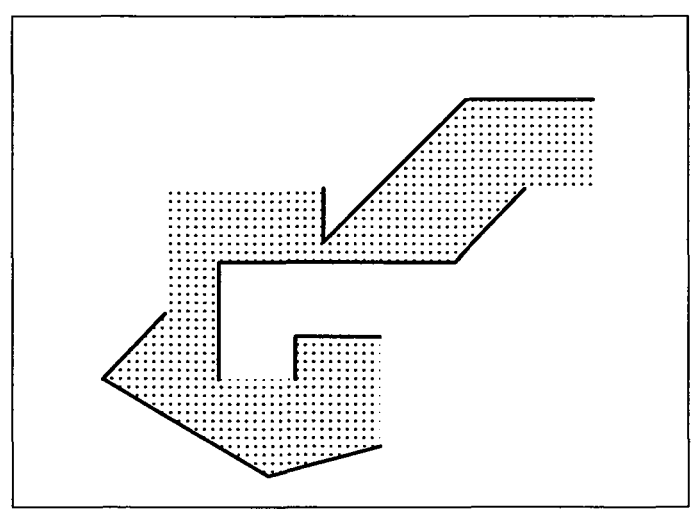
Figure 13A:
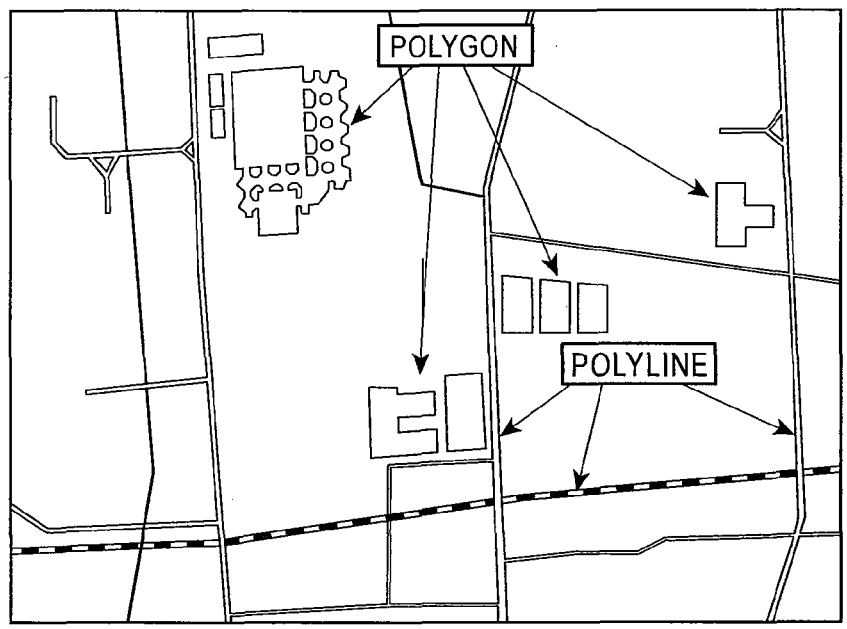
FIGS. 13A and 13B are diagrams illustrating examples of display of a polygon corresponding to polygon data and a polyline corresponding to polyline data in a map screen.
Figure 13B:
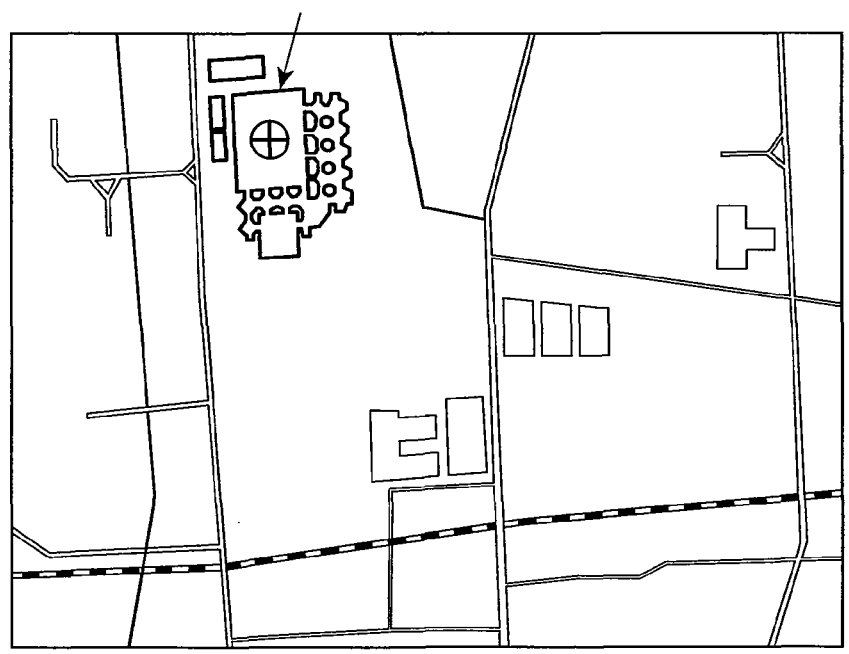

FIGS. 4A and 4B show an example of the process described above. Specifically, the example of the process performed by the database data processor 2 shown in FIGS. 4A and 4B is similar to an example of the polygon data which is similar to the polygon data shown in FIG. 10. The example of the polygon data corresponds to a polygon having an outline including lines a to b, b to c, c to d, . . . , and q to a. In the example shown in FIGS. 4A and 4B, among the lines included in the outline, the line d to e overlaps with a horizontal boundary line of map meshes, the line e to f overlaps with a vertical boundary line, the line i to j overlaps with a vertical boundary line, the line l to m overlaps with a horizontal boundary line, the line p to q overlaps with a horizontal boundary line, and the line q to a overlaps with a vertical boundary line.

In FIG. 4A, thick dotted lines represent results of the process of shifting a coordinate of an element point of interest inward by 1 from a map mesh boundary performed on the polygon data as shown in FIG. 2. Specifically, since the line d to e overlaps with the horizontal boundary line of the map meshes, the line d to e is shifted downward so as to be shifted toward an inside of the polygon by 1. Furthermore, since the line e to f overlaps with the vertical boundary line, the line e to f is shifted rightward so as to be shifted toward the inside of the polygon by 1. Furthermore, since the line i to j overlaps with the vertical boundary line, the line i to j is shifted leftward so as to be shifted toward the inside of the polygon by 1. Furthermore, since the line l to m overlaps with the horizontal boundary line, the line l to m is shifted downward so as to be shifted toward the inside of the polygon by 1. Furthermore, since the line p to q overlaps with the horizontal boundary line, the line p to q is shifted upward so as to be shifted toward the inside of the polygon by 1. Furthermore, since the line q to a overlaps with the vertical boundary line, the line q to a is shifted leftward so as to be shifted toward the inside of the polygon by 1.

Figure 5A:
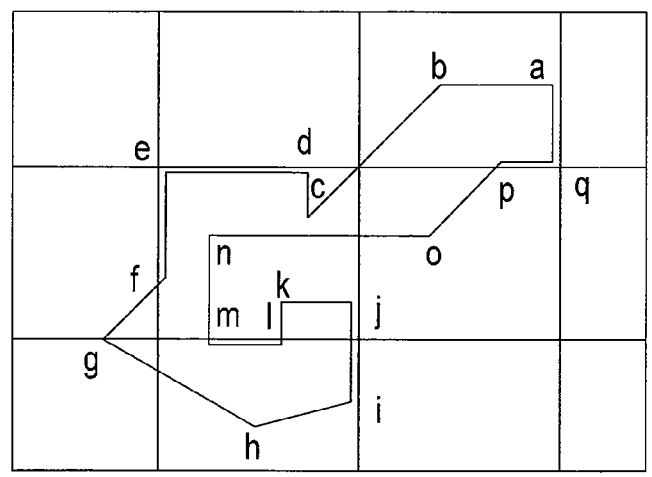
FIGS. 5A to 5C are diagrams illustrating an example of a process performed by the database compiler according to this embodiment.
Figure 5B:
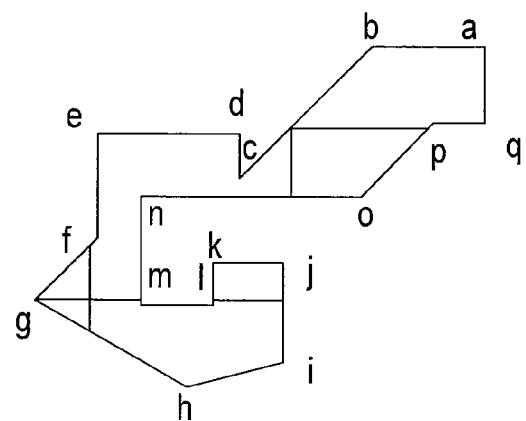

Consequently, a result of the process described above is obtained as shown in FIG. 4B. Note that processed portions are denoted by thick dotted lines. As the result of the process, the processed data shown in FIG. 5A and the processed data representing the polygon shown in FIG. 5B are obtained together with the map mesh boundary lines. Note that the data shown in FIG. 5B includes the outline and the map mesh boundaries which are displayed together with the polygon.

FIG. 3 shows the example of the process of emphatically displaying the polygon in the monitor using the polygon data processed in accordance with the process flow shown in FIG. 2. Specifically, in the process flow of the polygon emphasis display process performed by the map display unit 3 shown in FIG. 3, a request for displaying a map of a specific region having a predetermined scale is input in step S11. That is, the process shown in FIG. 3 is performed as a process of application software in the navigation device, for example, and accordingly, the navigation device issues a request for displaying a map including a current position as a center or a map including a point specified by the cursor as a center, for example. Note that, if the user does not specify a scale of the map, a map scale which has been set in advance is automatically selected.

In step S12, map meshes of a map requested as described above which include a certain region including a specific point and which is of the specified scale is selected from the map database 1 so that map data is obtained. In step S13, polygon data included in the selected map meshes is obtained after being subjected to the map mesh boundary shifting process shown in FIG. 2 so that a map is displayed. In the example shown in FIG. 2, every time the map is displayed, data including a polygon processed by the database data processor 2 as described above is used. However, in the map is displayed first, it is not necessarily, and previous polygon data which has been stored in the map database 1 may be obtained and displayed, and thereafter, the processed polygon data may be obtained when the polygon emphasis display process is performed.

In step S14, a polygon to be emphatically displayed is selected. Specifically, when the user wishes to clearly recognize a specific polygon in a map screen displayed in the monitor as described above, the specific polygon is selected using the cursor. Alternatively, when the user wishes to emphatically display all polygons, an instruction for selecting all the polygons is issued or all the polygons are selected as an initial setting.

When the polygon to be emphatically displayed is selected in step S14, an array of shape element points of the selected polygon is obtained from the obtained polygon data which has been processed in step S15. In step S16, the shape element points are sequentially selected in accordance with data of the obtained array of the shape element points. In step S17, it is determined whether a line which connects the selected one of the shape element points and the next shape element point to each other is in contact with a map mesh boundary.

Figure 5C:
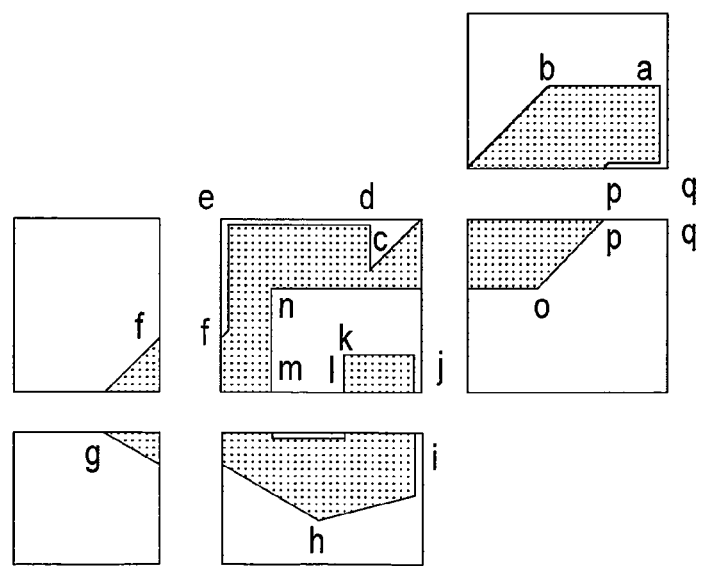

Specifically, in this process, for example, in a case where processed data which has been divided by map meshes is stored as shown in FIG. 5C, the map display unit 3 obtains the data and connects the divided data blocks to one another so that a polygon corresponding to polygon data shown in FIG. 5B is displayed in the monitor. When the polygon is emphatically displayed, map mesh boundary lines are emphatically displayed in addition to the outline of the polygon. Therefore, in order not to display the polygon outline positioned on portions of the map mesh boundary lines, it is determined whether a line which connects a shape element point of interest to the next shape element point is in contact with one of the map mesh boundary lines in step S17. When the determination is affirmative in step S17, the process proceeds to step S18 where the line is not emphatically displayed.

On the other hand, when the determination is negative in step S17, the line is emphatically displayed in step S19. After performing the process of step S18 or step S19, the process proceeds to step S20 where all the shape element points have been selected. When the determination is negative in step S20, the process returns to step S16 and the process described above is performed again until all the shape element points are selected while the shape element points are sequentially selected. On the other hand, when the determination is affirmative in step S20, the processed polygon data is output and displayed in step S21.

The process described above is an example in which one polygon is selected to be emphatically displayed in step S14. When a plurality of polygons are to be emphatically displayed, the polygons are sequentially selected and subjected to the process described above, and thereafter, all the polygons are processed to be output and displayed.

The process described above is realized such that when a state in which the normal polygon display unit 15 displays a polygon is changed by inputting an instruction for performing polygon emphasis display using the emphasis-display-instruction inputting unit 17 of the polygon emphasis display unit 16, the data stored in the processed-data storage unit 10 included in the database data processor 2 which is obtained using the unit 18 for obtaining data in which an outline portion of a polygon on a map mesh boundary has been shifted is obtained through the processed data outputting unit 11. Thereafter, when the unit 20 for detecting an outline portion of a polygon on a map mesh boundary determines that a polygon element point which is sequentially selected from among polygon element points by the polygon element selecting unit 19 is included in a portion of the polygon outline positioned on one of the map mesh boundaries, the polygon emphasis display processor 21 performs the processes in step S18 and step S20 shown in FIG. 3.

Figure 6A:
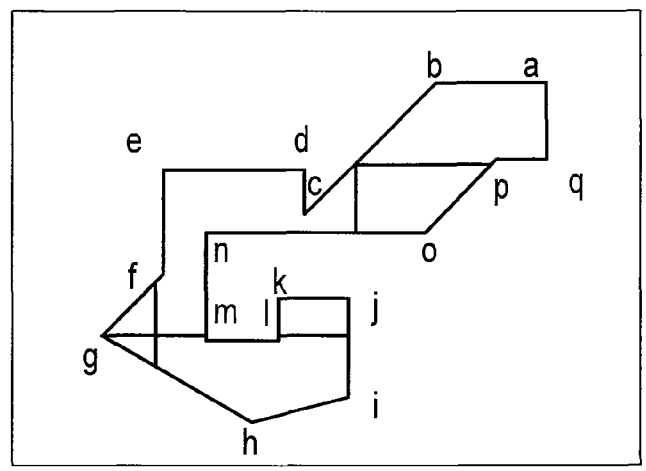
FIGS. 6A to 6C are diagrams illustrating an example of a process performed by the map display unit.
Figure 6B:
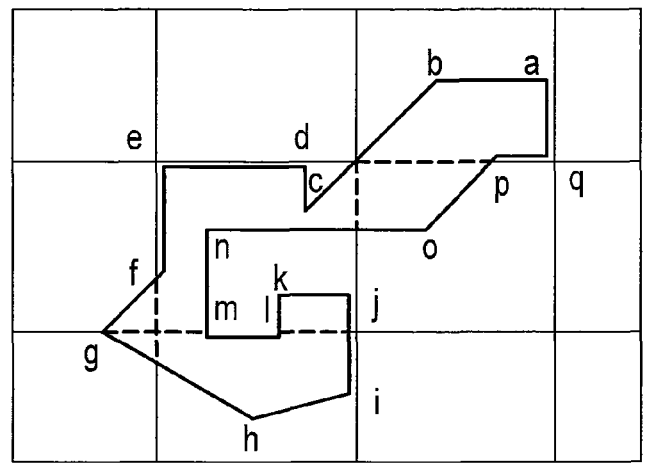
Figure 6C:
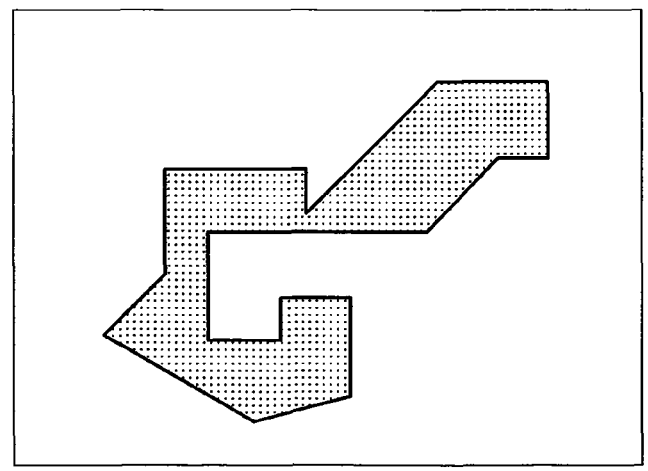

Furthermore, in an actual data process, when the polygon is to be emphatically displayed on the basis of the processed data shown in FIG. 5B, the map mesh boundary lines are also emphatically displayed as shown in FIG. 6A. However, as for the portions of the outline of the polygon positioned on the map mesh boundary portions, which are denoted by the dotted lines in FIG. 6B, in response to the determination in step S17 that lines which connect shape element points of interest and the next shape element points to each other are in contact with the map mesh boundaries, the process of not emphatically displaying the lines is performed in step S18. Accordingly, a polygon in which the map mesh boundary lines therein are not emphasized can be displayed while the outline of the polygon is emphatically displayed.

Figure 7A:
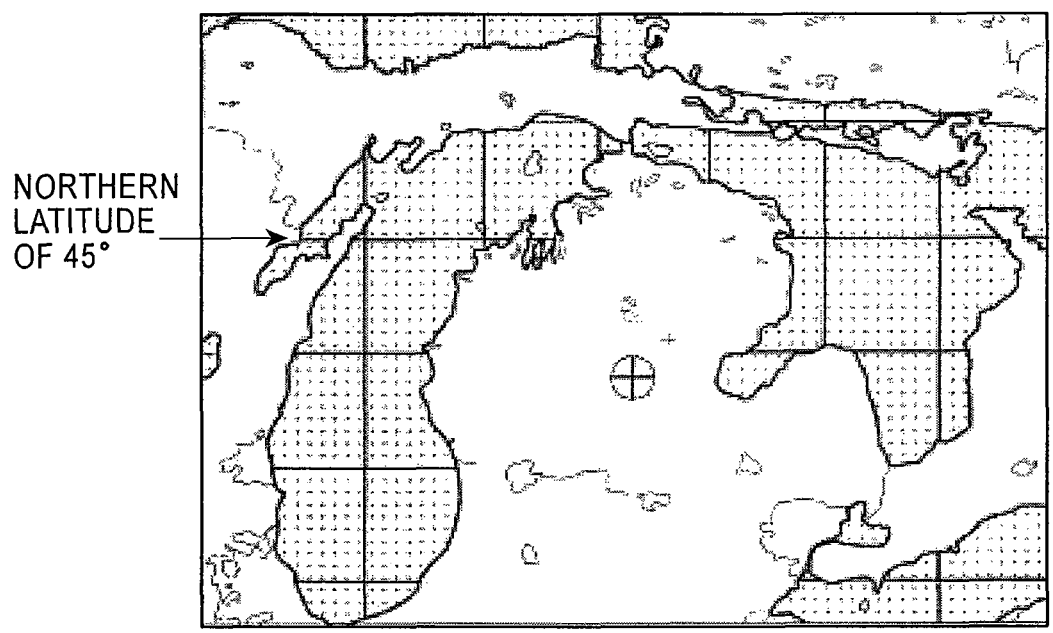
FIG. 7A is a diagram illustrating an example of emphasis display of a polygon according to the embodiment and FIG. 7B is a diagram illustrating an example of emphasis display of a polygon according to a related art.
Figure 7B:
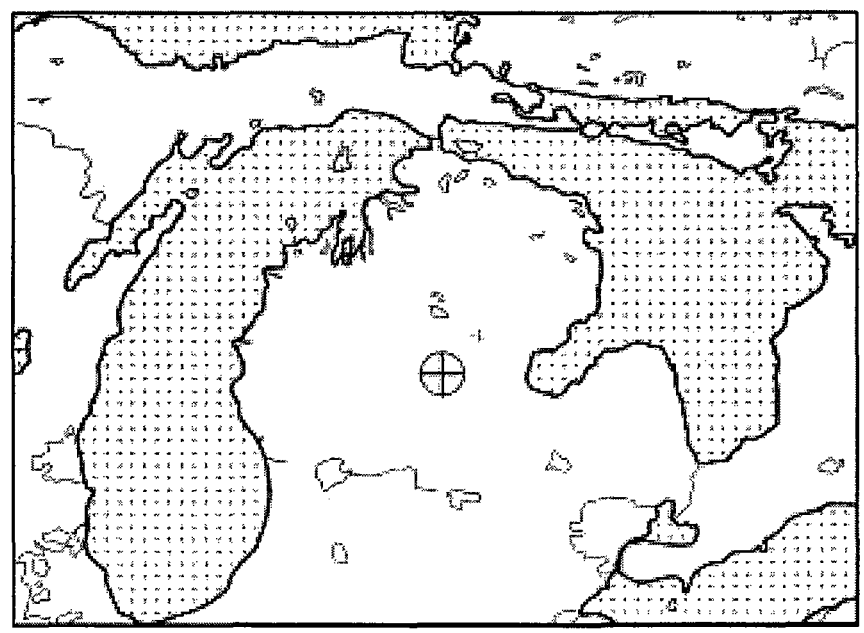
Figure 8A:
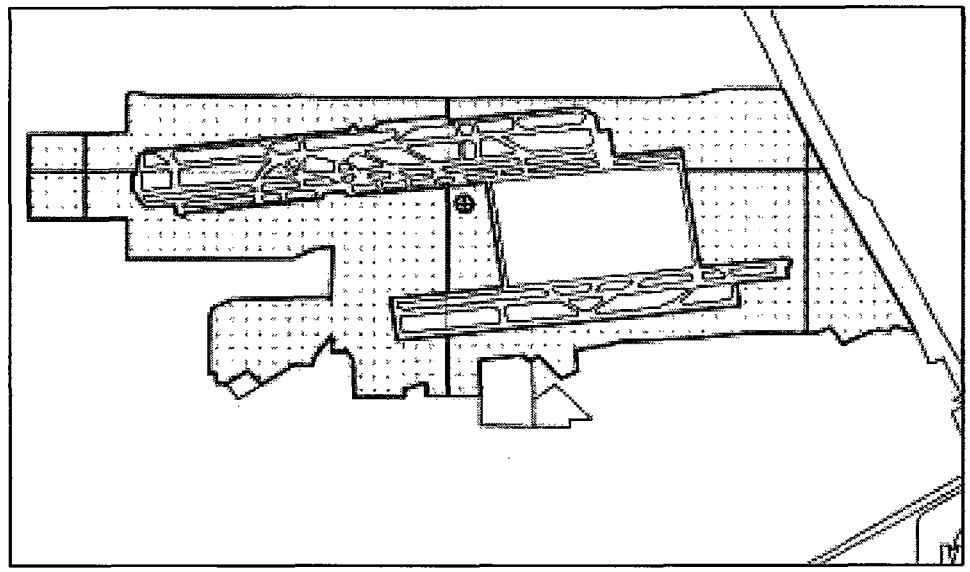
FIG. 8A is a diagram illustrating another example of emphasis display of a polygon according to the embodiment and FIG. 8B is a diagram illustrating another example of emphasis display of a polygon according to the related art.
Figure 8B:
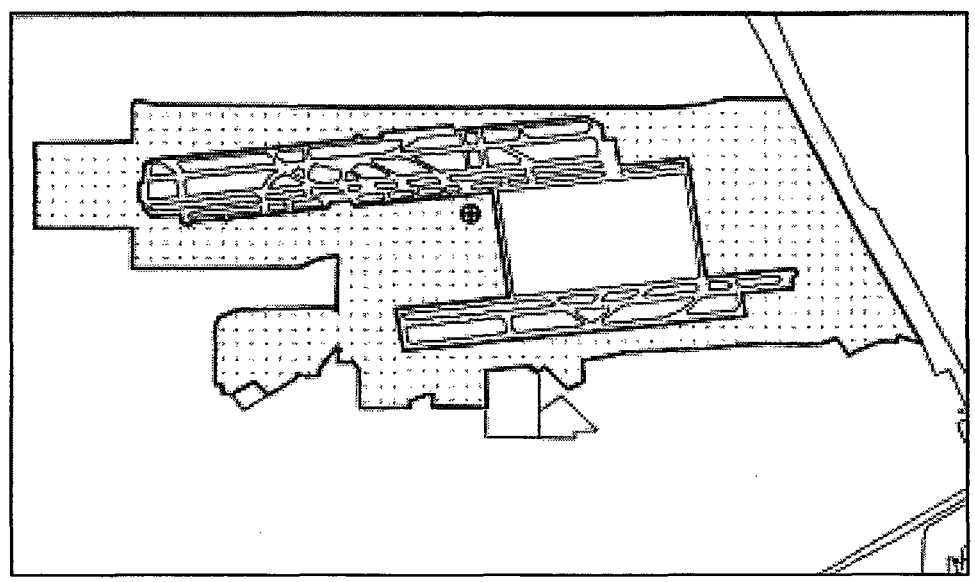
Figure 9A:
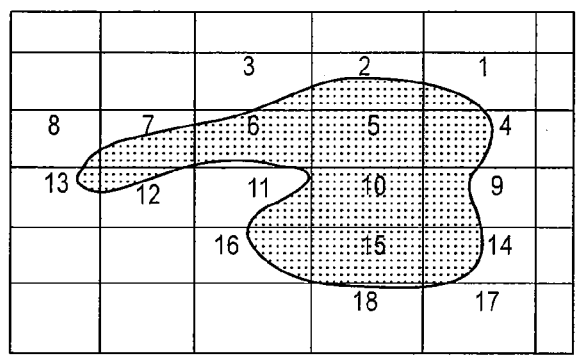
FIGS. 9A to 9D are diagrams used for explanation of problems which arise when a polygon is emphatically displayed.
Figure 9B:
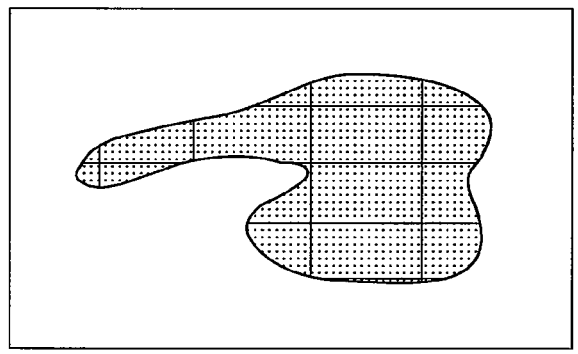
Figure 9C:
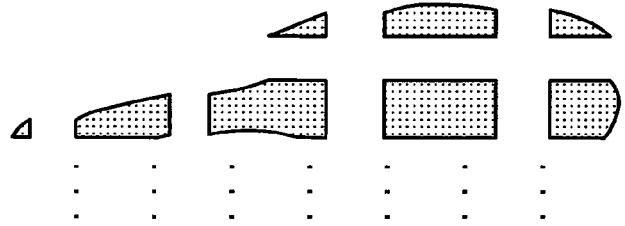
Figure 9D:
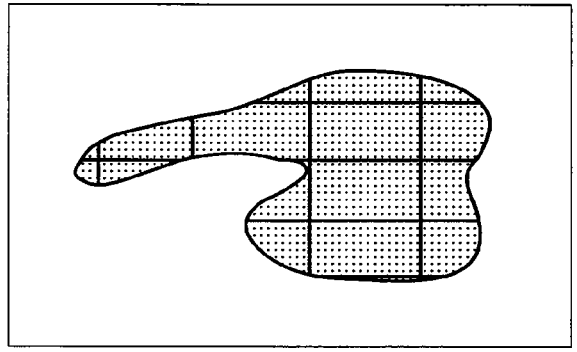

Conventionally, as shown in the example of display of the map of the area around the Great Lakes in FIG. 7A, when the area is emphatically displayed, several map mesh boundary lines are emphatically displayed in the map, and therefore, appearance of the map is poor. However, as a result of the process described above, a map in which the map mesh boundary lines are not displayed, and therefore, appearance of the map is excellent as shown in FIG. 7B can be displayed. Similarly, in the example of display of a map of an airport shown in FIGS. 8A and 8B, conventionally, several map mesh boundary lines are emphatically displayed when a selected polygon is emphatically displayed as shown in FIG. 8A. However, according to the embodiment of the present invention, the map in which the polygon is clearly shown since the map mesh boundary lines are removed can be displayed as shown in FIG. 8B.

The present invention including the processes described above can be applicable to not only navigation devices but also portable map display devices including cellular phones. Furthermore, the present invention is applicable to all map display devices such as computers which display maps. Moreover, the present invention is similarly applicable to, among various types of map data currently used, map data which has a format of KIWI, HAL, or ALES, for example, and which is divided for individual several map meshes, that is, the present invention is applicable to various formats.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims

What is claimed is:

1. A method for rendering an outline of a polygon on a map, comprising the steps of:
   sequentially selecting element points included in the outline of the polygon represented by polygon data obtained from a map database;
   when it is determined that a selected one of the polygon element points is positioned on a map mesh boundary, coordinate-shifting the polygon element point toward an inside portion of the polygon by a predetermined amount so that the polygon element point is not positioned on the map mesh boundary,
   wherein the map mesh boundary corresponds to a longitude or a latitude, and
   wherein the step of coordinate-shifting the polygon element point is performed by a processor so that the polygon data recorded in the map database is displayed on the map;
   obtaining the polygon data which has been coordinate-shifted when the polygon is to be displayed in an emphatic manner; and
   displaying a portion of the outline of the polygon in a non-emphatic manner when the portion of the outline of the polygon represented by the obtained polygon data is positioned on a map mesh boundary, and displaying remaining portions of the outline of the polygon in an emphatic manner,
   wherein when a portion of the outline of the polygon is to be displayed in a non-emphatic manner, no outline for the portion of the outline is displayed.

2. The method for rendering an outline of a polygon according to claim 1,
   wherein the coordinate-shifting of a polygon element point toward an inside portion of a polygon by a predetermined amount is performed on a polygon in a range of a displayed map when the map is displayed.

3. The method for rendering an outline of a polygon according to claim 1,
   wherein the coordinate-shifting of a polygon element point toward an inside portion of a polygon by a predetermined amount is performed on map data in a predetermined distance range, including a region around a range of a displayed map when a map is displayed.

4. The method for rendering an outline of a polygon according to claim 1,
   wherein the coordinate-shifting of a polygon element point toward an inside portion of a polygon by a predetermined amount is performed on map data in an arbitrary range when the map is displayed and when the map is not displayed.

5. The method for rendering an outline of a polygon according to claim 1,
   wherein the coordinate-shifting of a polygon element point toward an inside portion of a polygon by a predetermined amount is performed only on a polygon selected by a user.

6. The method for rendering an outline of a polygon according to claim 1,
   wherein all polygons to be displayed are selected to be coordinate-shifted for a polygon element point toward an inside portion of a polygon by a predetermined amount.

7. The method for rendering an outline of a polygon according to claim 1,
   wherein the coordinate-shifting of a polygon element point toward an inside portion of a polygon by a predetermined amount is performed when the map database is constructed, and resultant data is recorded in the map database together with data which has not been processed.

8. The method for rendering an outline of a polygon according to claim 1,
   wherein data which has been coordinate-shifting for a polygon element point toward an inside portion of a polygon by a predetermined amount, is stored, and thereafter, the stored data is used when the polygon is to be displayed, and polygon data which has not been coordinate-shifted is not displayed.

9. An apparatus for rendering an outline of a polygon on a map, comprising:
   a database data processor including:
      a polygon element point selecting unit configured to sequentially select element points included in the outline of the polygon, said element points corresponding to polygon data obtained from a map database,
      a first detecting unit configured to detect an outline portion of a polygon on a map mesh boundary, and configured to determine whether one of the selected polygon element points is positioned on a map-mesh boundary, and
      a coordinate-shifting processor configured to coordinate-shift a polygon element point toward an inside portion of a polygon by a predetermined amount so that the polygon element point is not positioned on the map mesh boundary, when it is determined that one of the detected polygon element points is positioned on the map-mesh boundary,
      wherein the map mesh boundary corresponds to a longitude or a latitude, and
      wherein a database compiler in the database data processor processes data so that data recorded in the map database is displayed on the map; and
   a map display unit configured to display a map including:
      a data obtaining unit configured to obtain data which has been coordinate-shifted, and configured to obtain the polygon data which has been coordinate-shifted by the database data processor,
      a second detecting unit configured to detect an outline portion of a polygon on a map mesh boundary, and configured to determine whether an outline portion of the polygon corresponding to the data obtained by the data obtaining unit, which has been coordinate-shifted, is positioned on a map mesh boundary when the polygon is to be displayed in an emphatic manner, and
      a polygon emphasis display processor configured to display the outline portion of the polygon in a non-emphatic manner, when the second unit for detecting determines that the outline portion of the polygon is positioned on the map mesh boundary, and configured to display remaining outline portions of the polygon in an emphatic manner,
      wherein when a portion of the outline of the polygon is to be displayed in a non-emphatic manner, no outline for the portion of the outline is displayed.

10. The polygon outline rendering apparatus according to claim 9,
    wherein the coordinate-shifting of a polygon element point toward an inside portion of a polygon by a predetermined amount is performed on a polygon in a range of a displayed map when the map is displayed.

11. The polygon outline rendering apparatus according to claim 9,
wherein the coordinate-shifting of a polygon element point toward an inside portion of a polygon by a predetermined amount is performed on map data in a predetermined distance range including a region around a range of a displayed map, when a map is displayed.

12. The polygon outline rendering apparatus according to claim 9,
wherein the coordinate-shifting of a polygon element point toward an inside portion of a polygon by a predetermined amount is performed on map data in an arbitrary range when the map is displayed and when the map is not displayed.

13. The polygon outline rendering apparatus according to claim 9,
wherein the coordinate-shifting of a polygon element point toward an inside portion of a polygon by a predetermined amount is performed only on a polygon selected by a user.

14. The polygon outline rendering apparatus according to claim 9,
wherein all polygons to be displayed are selected to be coordinate-shifted for a polygon element point toward an inside portion of a polygon by a predetermined amount.

15. The polygon outline rendering apparatus according to claim 9,
wherein the coordinate-shifting of a polygon element point toward an inside portion of a polygon by a predetermined amount is performed when the map database is constructed, and resultant data is recorded in the map database together with data which has not been processed.

16. The polygon outline rendering apparatus according to claim 9,
wherein data which has been coordinate-shifted for a polygon element point toward an inside portion of a polygon by a predetermined amount, is stored, and thereafter, the stored data is used when the polygon is to be displayed, and polygon data which has not been coordinated-shifted is not displayed.

* * * * *